United States Patent [19]

Benson et al.

[11] Patent Number: 4,474,000

[45] Date of Patent: Oct. 2, 1984

[54] RECUPERATED TURBINE ENGINE

[75] Inventors: Jack J. Benson, Lathrup Village; John F. Jones, Berkley; Sam B. Williams, Bloomfield Hills, all of Mich.

[73] Assignee: Williams International Corporation, Walled Lake, Mich.

[21] Appl. No.: 441,082

[22] Filed: Nov. 12, 1982

[51] Int. Cl.³ .............................................. F02C 7/10
[52] U.S. Cl. ................................. 60/39.511; 165/9
[58] Field of Search ................ 60/39.511, 604; 165/9

[56] References Cited

U.S. PATENT DOCUMENTS 3,401,740  9/1968  Trudeau ............................ 165/9 X
3,692,097  9/1972  Penny ................................. 165/9
3,893,505  7/1975  Fujikake et al. ................... 165/9
4,213,297  7/1980  Förster et al. .................. 60/39.511

Primary Examiner—Louis J. Casaregola
Assistant Examiner—Donald E. Stout
Attorney, Agent, or Firm—Lyman R. Lyon

[57] ABSTRACT

The disclosure relates to an improved recuperative heat exchanger for a turbine engine. Heat exchanger modules have discrete passages therein for the relatively high pressure compressor discharge air and relative low pressure exhaust gases. A continuous seal is provided at each end of the exhaust passages in the heat exchanger that is expandable into positive engagement with the heat exchange module.

1 Claim, 5 Drawing Figures

U.S. Patent  Oct. 2, 1984  Sheet 1 of 2  4,474,000
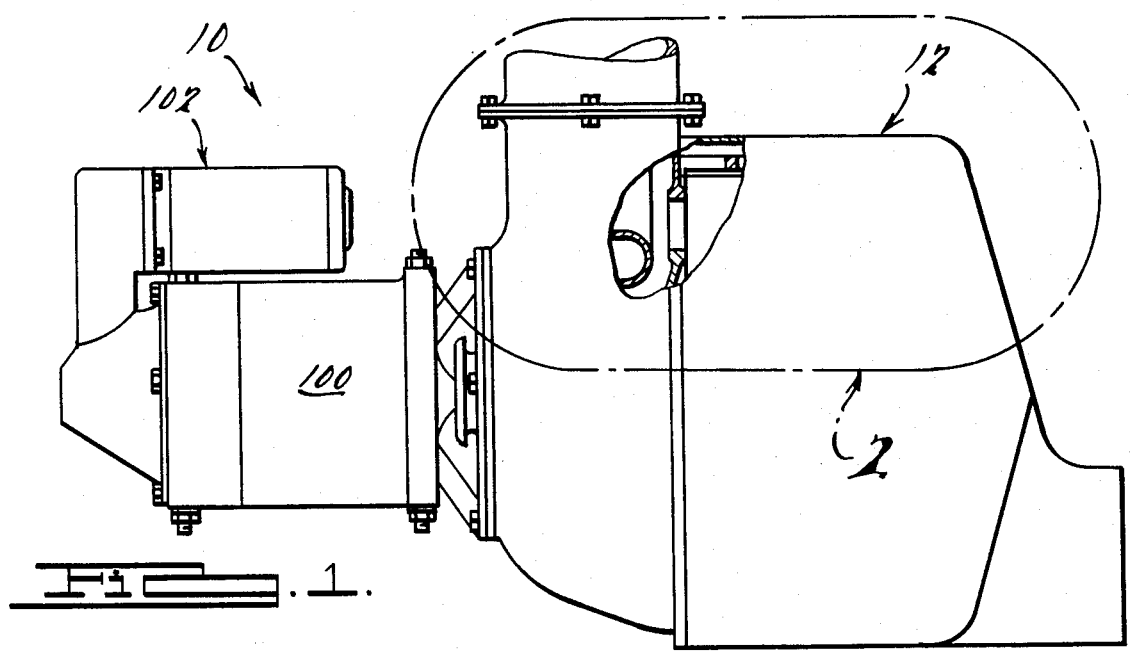
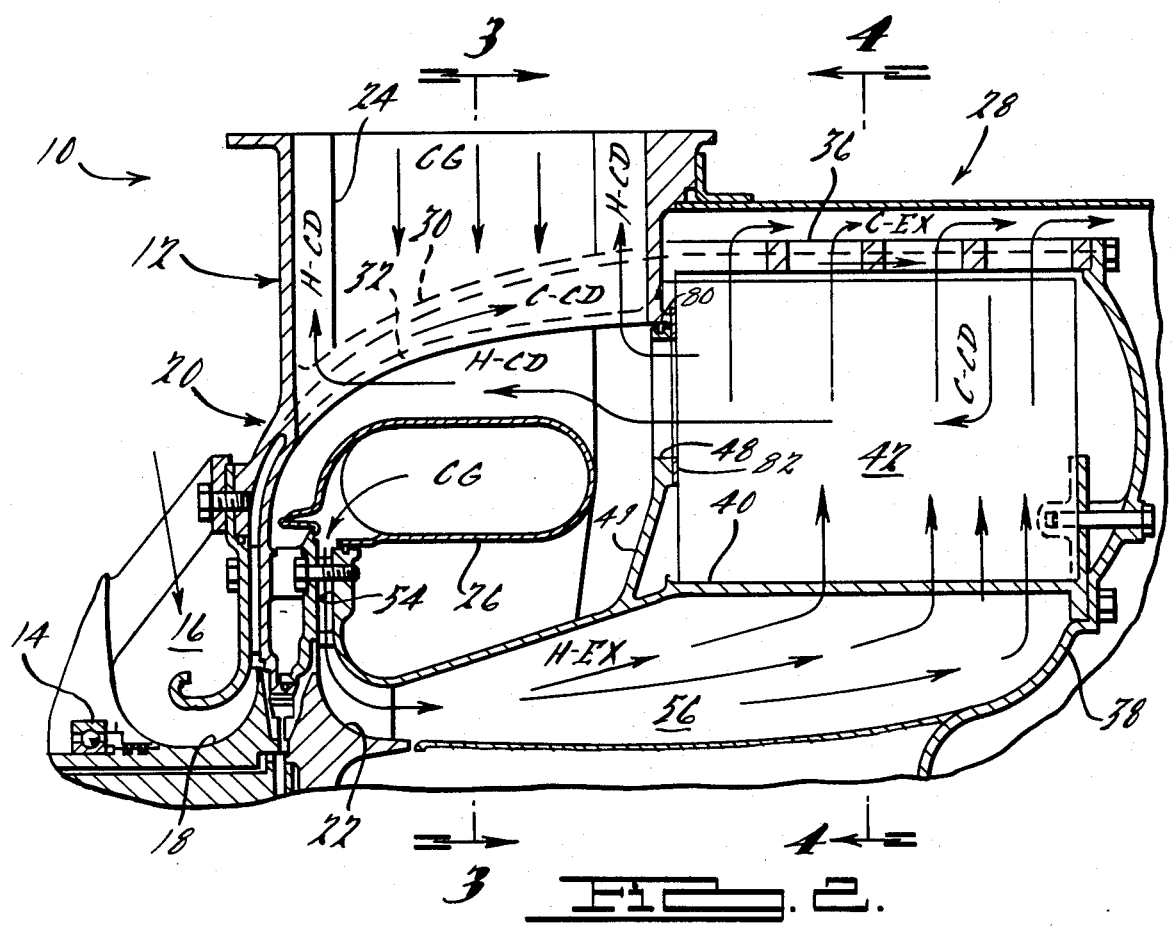

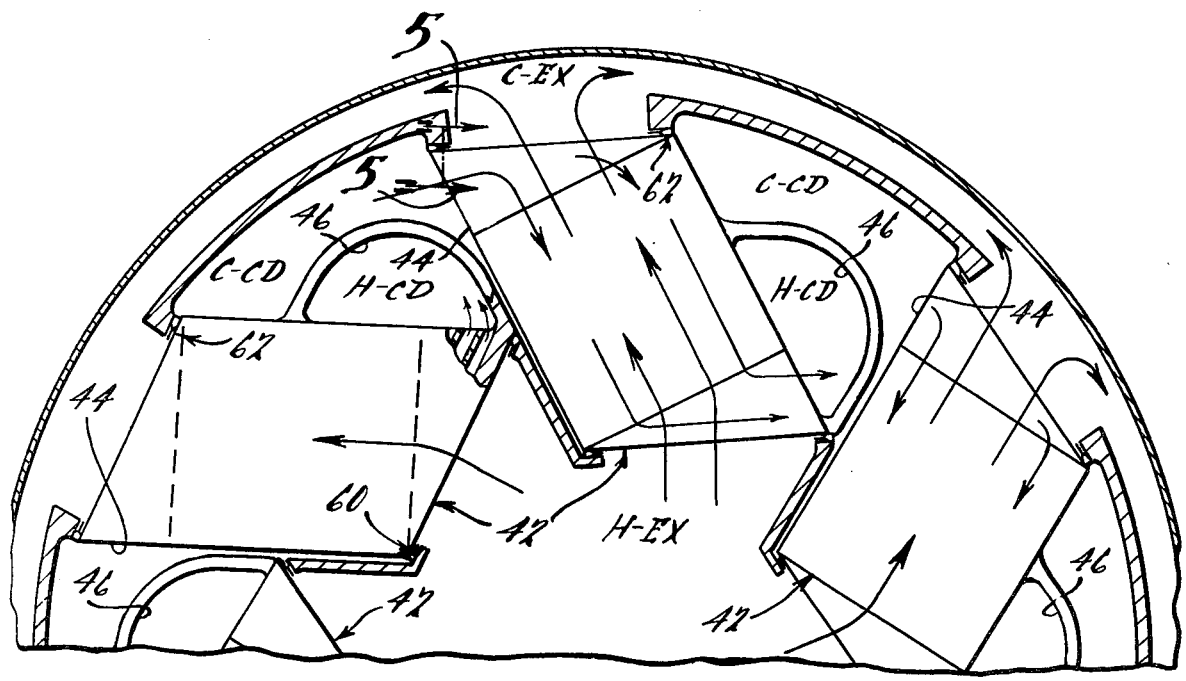

RECUPERATED TURBINE ENGINE

BACKGROUND OF THE INVENTION

Brayton cycle engines generally comprise means for compressing air for the support of combustion, a combustion chamber which has inlets for both the compressed air and fuel, and means for extracting energy from the hot exhaust gases to produce mechanical work. When a turbine is used to extract energy, the hot exhaust gases produced in the combustion chamber are fed to a turbine that rotates a drive shaft. In a recuperated turbine engine, exhaust gases of the turbine are passed through a recuperative heat exchanger that heats the relatively cold compressed air from the compressor to maximize efficiency of the engine.

The efficiency of the recuperated gas turbine engine depends in part on the efficiency of the heat exchanger. The heat exchanger utilizes residual energy contained in the hot exhaust gases for preheating the compressed air supplied to the turbine. The efficiency of the heat exchanger is the ratio of heat actually transferred in the heat exchanger to the heat theoretically transferable by an infinitely large heat exchange surface. Because of the high temperature on the hot gas side of the heat exchanger, the materials used must be limited to highly heat resistant metals or ceramic materials. A critical factor is that leakage between the hot exhaust and cold high pressure air sides of the heat exchanger must be precluded.

SUMMARY OF THE INVENTION

The invention relates to an improved engine and recuperative heat exchanger geometry as well as a mounting system therefor that effects positive sealing of high pressure air with respect to the exhaust passages. Compressor discharge air is introduced into the area surrounding the regenerator modules and is prevented from escaping into the exhaust system by flexible metal seal elements which enclose the exhaust passages and bear against the outer faces of ceramic heat exchanger modules. As a result, the ceramic heat exchanger modules are in overall compression so that any cracks therein tend to close rather than open. All seal leakage comprises air at compressor discharge temperature so that there are no hot streaks across the seal areas. The net pressure forces on the flexible seals tends to hold them firmly against the recuperator modules.

BRIEF DESCRIPTION OF THE DRAWINGS

FIG. 1 is a side elevation, partially in section, of a recuperated turbine engine utilizing the recuperative system of the instant invention.

FIG. 2 is a view taken within the circle 2 of FIG. 1.

FIG. 3 is a sectional view taken along the line 3—3 of FIG. 2.

FIG. 4 is a sectional view taken along the line 4—4 of FIG. 2.

FIG. 5 is a sectional view taken along the line 5—5 of FIG. 4.

DETAILED DESCRIPTION OF THE PREFERRED EMBODIMENT OF THE INVENTION

Referring to FIGS. 1 and 2 of the drawings a gas turbine engine 10 utilizes an overhung compressor and turbine system 12 supported by bearings 14 at the inlet side 16 of a compressor 18. A main housing 20 supports and contains the compressor 18, a turbine rotor 22, a combustor 24, an associated turbine inlet scroll 26 and a recuperator assembly 28. Cold compressor discharge air C-CD is ducted between two walls 30 and 32 of the main housing 20 rearwardly to the recuperator assembly 28. The cold compressor discharge air passage is annular except where a combustor pressure tube 34 (FIG. 3) passes through it.

A rear portion 36 of the main housing 20, in combination with a rear pressure cover 38 and a turbine outlet housing 40 forms an enclosure for a number of trapezoidal ceramic counterflow heat exchanger modules 42.

As best seen in FIGS. 2 and 4, cold compressor discharge air C-CD enters the modules 42 through openings 44 in their sides at the radially outer extremities of the modules 42. Compressor discharge air flows radially and axially inwardly through the elements 42 in a Z-shaped flow path where it is preheated by heat absorbed from exhaust gas in adjacent passages. The heated compressor discharge air is collected in ducts 46 formed as part of the heat exchanger modules 42, and is ducted through apertures 48 in a radially extending diaphragm 49 in the turbine outlet housing 40 into the space surrounding the turbine inlet scroll 26. As best seen in FIG. 3, the preheated air flows into a burner pressure dome 50 around a burner flame tube 52 on the combustor 24 and thence into the combustion zone.

The hot products of combustion CG are ducted via a burner outlet/turbine inlet scroll 54 to the turbine 22. After passing through the turbine 22, the exhaust gases H-EX are ducted to the radially inner zone 56 of the recuperator section 28. The exhaust gas H-EX then flows radially outwardly through the recuperator modules 42, heat being extracted therefrom and transmitted to the relatively cool compressed air C-CD flowing radially inwardly in the adjacent passages of the modules 42.

In accordance with one feature of the instant invention, sealing of the cold and hot high pressure air C-CD and H-CD, respectively, from the exhaust gases H-EX is accomplished by like rectangular "picture frame" seal elements 60 and 62, at the radially inner and outer ends, respectively, of the exhaust passages, in the modules 42. The seal elements 60 and 62 are fabricated from, for example, stainless steel and comprise spaced outer flange portions 64 and 66, intermediate flange portions 68 and 70 and juncture flanges 72 and 74. The seal elements 60 and 62 bear against the outer faces of the recuperator modules 42, as shown in FIG. 4, placing the ceramic heat exchanger modules 42 in overall compression so that any cracks that develop therein tend to close rather than open. In the event of seal leakage, the flow of air is toward the exhaust side of the modules 42 at all times so that all seal leakage comprises air at compressor discharge temperature so as to preclude hot streaks across the seal areas. Moreover, there is no opportunity for the hot exhaust gas H-EX to bypass the modules 42 since it is completely contained by the high pressure seals 60 and 62.

As best seen in FIG. 2, a ring seal 80 prevents compressor discharge air from bypassing the modules 42. A seal 82, which may be of a cross section similar to the seals 60 and 62, is provided between the diaphragm 49 on the turbine outlet housing 40 and the heat exchanger core 42 to prevent bypassing the compressed air side thereof.

The recuperated turbine engine 10 of the instant invention may be combined with either a high speed, direct driven alternator 100 or a conventional reduction gear box (not shown). When the high speed alternator 100 is used, the compressor 18 and turbine rotor 22 may be supported by an overhang from the alternator shaft. The use of the high speed alternator 100 eliminates a reduction gear box and the normal drives for the fuel and oil pumps (not shown). When this option is used, these pumps may be driven by a small electric motor, the speed of which is controlled by an electronic engine control so that fuel flow is matched to engine requirements. A suitable starter drive 102 is provided at the outboard end of the alternator 100.

While the preferred embodiment of the invention has been disclosed, it should be appreciated that the invention is susceptible of modification without departing from the scope of the following claims.

We claim:

1. In a recuperated turbine engine comprising an engine housing, means in said housing for compressing air for the support of combustion, a combustion chamber, means for introducing compressed air and fuel into said combustion chamber and, a turbine rotatable about a central axis for extracting energy from the gases produced in said combustion chamber, an improved recuperative heat exchanger comprising a plurality of heat exchanger modules of generally rectangular cross section having discrete counterflow passages therein, said modules being orientated in circumferentially spaced relation to one another with said discrete passages arranged for substantially radial counterflow of said compressor discharge air and exhaust gases relative to said central axis, and a continuous metal seal at each end of the exhaust passages in each of said heat exchangers, said seals directly supporting said heat exchangers against radially inward and outward movement relative said engine housing, said seals being of rectangular configuration complementary to said modules and of generally U-shaped cross section defined by relatively thin walls attached to one another on the exhaust gas side thereof and spaced from one another at the compressor discharge air side of said seal, said seals being expandable due to the bias of said high pressure compressor discharge air thereon into direct engagement with said heat exchange modules and said housing.

* * * * *